(No Model.)
H. F. KUHLMANN.
SAW GUARD.
No. 281,274. Patented July 17, 1883.
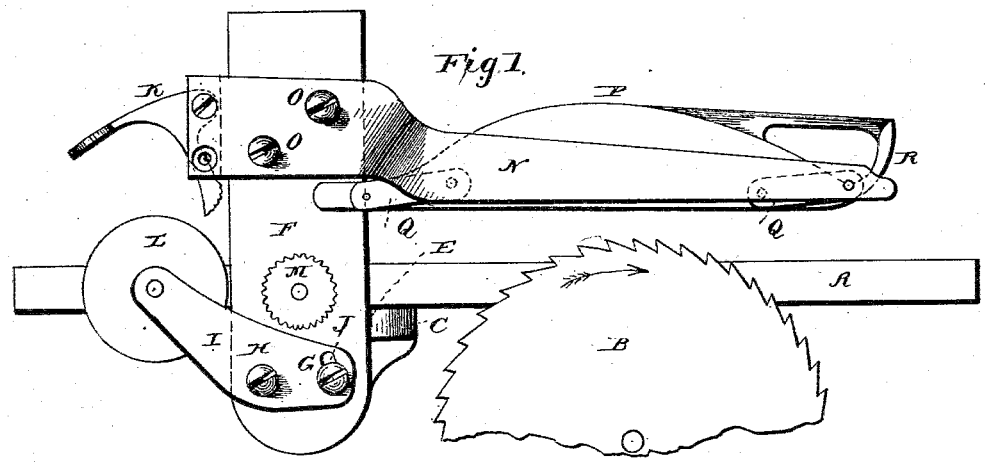
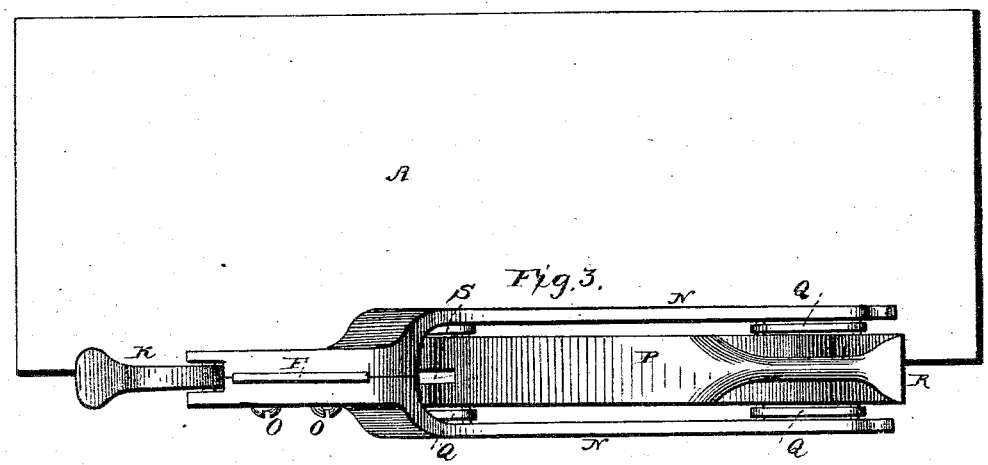
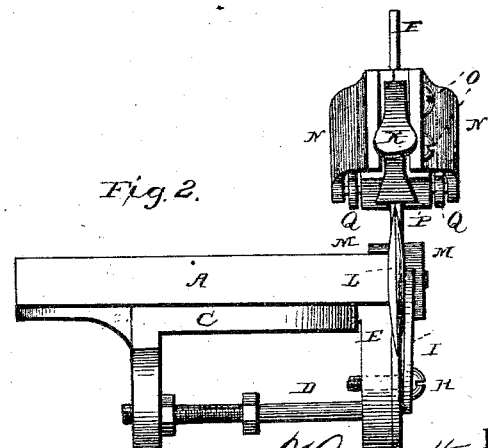
WITNESSES:
Fred. G. Dieterich
Jno. W. Stockett
INVENTOR.
Henry F. Kuhlmann
by Louis Bagger & Co.
ATTORNEYS

UNITED STATES PATENT OFFICE.

HENRY F. KUHLMANN, OF INDIANAPOLIS, INDIANA, ASSIGNOR, BY DIRECT AND MESNE ASSIGNMENTS, TO THE NATIONAL SAW-GUARD COMPANY, OF SAME PLACE.

SAW-GUARD.

SPECIFICATION forming part of Letters Patent No. 281,274, dated July 17, 1883.

Application filed November 4, 1882. (No model.)

*To all whom it may concern:*

Be it known that I, HENRY F. KUHLMANN, of Indianapolis, in the county of Marion and State of Indiana, have invented certain new and useful Improvements in Saw-Guards; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved saw-guard. Fig. 2 is a front view of the same, and Fig. 3 is a top view.

Similar letters of reference indicate corresponding parts in all the figures.

My invention contemplates certain improvements upon my Patent No. 264,412, bearing date of September 12, 1882; and it consists in the improved construction, combination, and arrangement of parts of a saw-guard, as will hereinafter be more fully described and claimed.

In the accompanying drawings, A represents the saw-table, and B the saw.

C is a plate fastened to the under side of the table, and having a projecting part, through which one end of screw D operates.

E is a plate sliding in ways in plate C and operated by screw D, and F is an upright plate fastened to the sliding plate E, all of which parts are substantially the same as in my former patent, and need no further explanation.

Fastened to plate F by the same screws, G and H, which fasten the said plate to the sliding plate E is an arm, I, which is made adjustable in position by having a slot, J, through which the screw G passes, and in which the upper end of the screw slides, and turning on the screw H, so that by loosening the screws the free end of the arm may be raised or lowered, as desired, and held in position by tightening the screws.

At the end of the arm I is journaled a wheel, L, which is lenticular in shape and projects up in the kerf of the lumber as it comes from the saw, and assists in splitting it and keeping the severed parts apart, the central portion of the wheel being thicker than the standard-plate F.

At both sides of the standard-plate, and projecting slightly above the saw-table, are journaled two rollers, M, having serrated or notched surfaces. These rollers are journaled on the same bolt, and as the sawed lumber comes from the saw the severed parts move over the surfaces of the rollers, which serve to feed the lumber away from the saw easier than if it slides on the flat saw-table.

To the upper part of the standard-plate are two brackets, N N, adjustably fastened by screws O. These arms or brackets extend over and on both sides of the saw, and the back stop, K, which is the same as mentioned in my former patent, is adjustably pivoted to the rear ends of the arms N, while a hood or guard, P, is hung to them by parallel arms or hangers Q. This hood is formed after the shape of that part of the saw it covers, and is beveled in front, as shown at R, to admit of the end of the lumber to be sawed to pass under the hood. The rear end of the hood has a slot, S, to admit of that end being pushed or swung on both sides of the standard-plate. This admits of the hood only being as large as that part of the saw it is intended to cover, the projecting ends on both sides of the slot guarding the saw from the rear.

Having thus described my invention, I claim and desire to secure by Letters Patent of the United States—

1. In a device for guarding circular saws, the combination of the arms N N, adjustably fastened to the standard-plate and extending on both sides of and above the saw, and the swinging hood P, hung from the arms N by hangers Q, beveled in front at R and slotted in the rear at S, and adapted to be lifted by the lumber to be sawed, and to cover that part of the saw which projects above the saw-table, substantially as set forth.

2. In a saw-guard, the combination of the standard-plate F, the adjustable arm I, the splitter-wheel L, the rollers M, the arms N N, adjustably fastened to the standard, and the swinging guard P, all constructed to operate as and for the purpose shown and set forth.

In testimony that I claim the foregoing as my own I have hereunto affixed my signature in presence of two witnesses.

HENRY F. KUHLMANN.

Witnesses:
CHARLES DREWES,
THEODORE STEIN.